(12) United States Patent
Gutierrez et al.

(10) Patent No.: US 8,261,241 B2
(45) Date of Patent: Sep. 4, 2012

(54) CONVERTING FORMAT STRINGS TO REGULAR EXPRESSIONS

(75) Inventors: Francisco Gutierrez, Burgos (ES); Assaf Landschaft, Munich (DE); Salai Valarmathi Ramakrishnan, Bangalore (IN); Michael Sprenglewski, Taufkirchen (DE)

(73) Assignee: Agere Systems Inc., Allentown, PA (US)

( * ) Notice: Subject to any disclaimer, the term of this patent is extended or adjusted under 35 U.S.C. 154(b) by 1079 days.

(21) Appl. No.: 12/118,001

(22) Filed: May 9, 2008

(65) Prior Publication Data

US 2009/0282391 A1 Nov. 12, 2009

(51) Int. Cl.
*G06F 9/44* (2006.01)

(52) U.S. Cl. ........ 717/128; 717/127; 707/759; 707/760; 707/761

(58) Field of Classification Search ...... 707/3, 759–761; 715/513, 501.1; 717/128, 127
See application file for complete search history.

(56) References Cited

U.S. PATENT DOCUMENTS

| 5,774,726 | A | 6/1998 | Ahmed | |
|---|---|---|---|---|
| 7,779,049 | B1 * | 8/2010 | Phillips | 707/809 |
| 7,949,670 | B2 * | 5/2011 | Sudhakar | 707/761 |
| 2007/0112731 | A1 * | 5/2007 | Balasubramanian | 707/3 |
| 2009/0119307 | A1 * | 5/2009 | Braun et al. | 707/100 |

OTHER PUBLICATIONS

Hui, Vernon W., "Microsoft Beefs Up VBScript with Regular Expressions," May 10, 1999, Retrieved from the internet: <URL: http://msdn2.microsoft.com/en-us/library/ms974570(printer).aspx> [Retrieved on Mar. 31, 2008].

* cited by examiner

*Primary Examiner* — Chat Do
*Assistant Examiner* — Lynda Dinh
(74) *Attorney, Agent, or Firm* — Mendelsohn, Drucker, & Associates, P.C.; Edward J. Meisarosh; Steve Mendelsohn

(57) ABSTRACT

In one embodiment, a method for correlating log entries in a log file to the line numbers of formatted-string output functions in source code, where the formatted-string output functions contain instructions to generate the log entries in the log file. The method includes locating the formatted-string output functions in the source code, where each formatted-string output function contains a format string. Each format string is processed to generate a corresponding regular expression to match log entries outputted by the corresponding formatted-string output function. Each regular expression is associated with the line number of the corresponding formatted-string output function. The resultant list of regular expressions and corresponding line numbers is processed with the log file, where log entries in the log file are modified to indicate the line numbers associated with matching regular expressions.

22 Claims, 2 Drawing Sheets

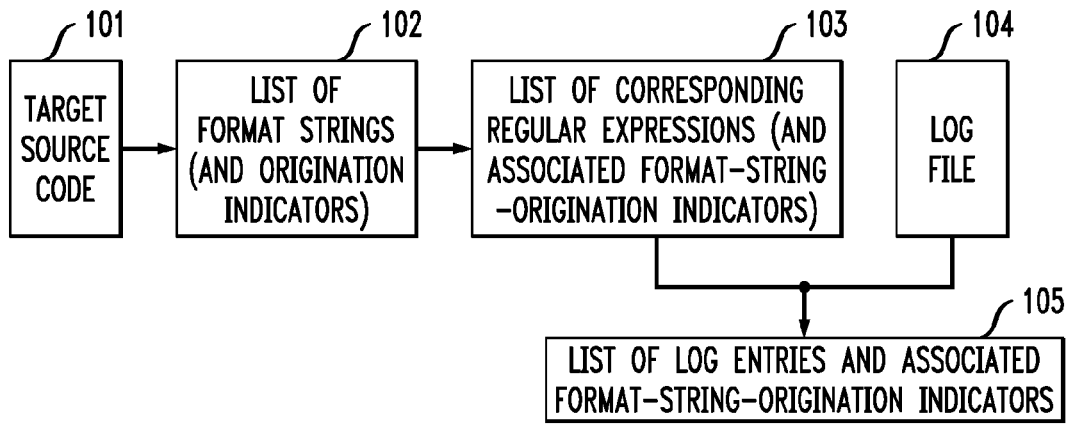
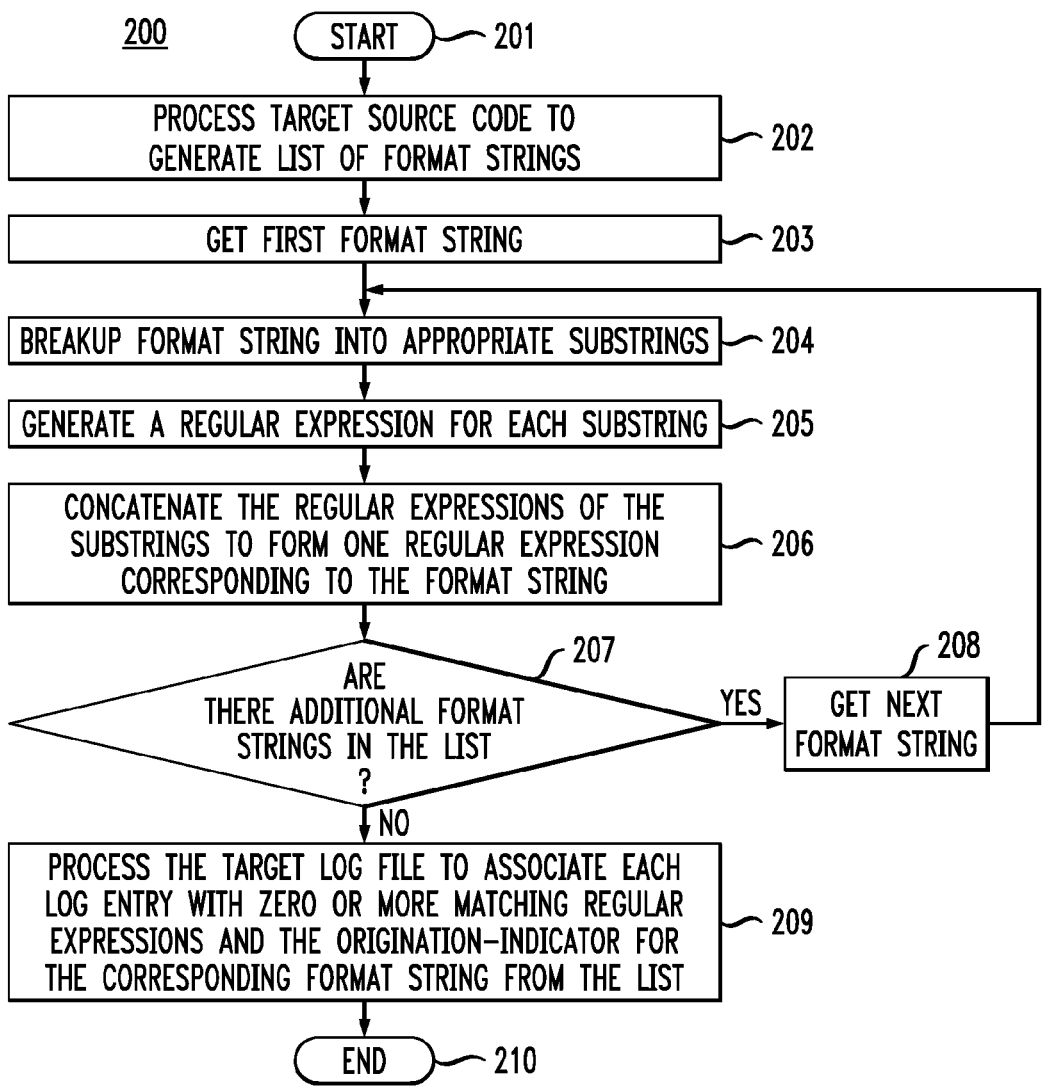

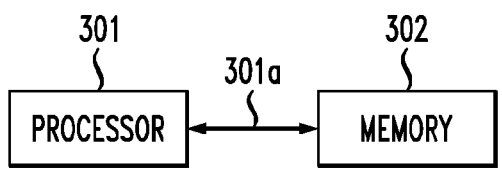

FIG. 4

```
1   GetRegExp (STRING)
2   <begin>
3     read STRING;
4     set RESULT = "";
5     set RAW_STRINGS = (use tokenizeString method to divide STRING into
6     token strings - each as one part of the format string);
7     for each RAW_STR in RAW_STRINGS
8       if RAW_STR is a type-specifier string (e.g., %f) then
9         RESULT = RESULT + (regular expression returned by
10    GenerateRegularExpression method in the PrintFType object);
11      else
12        RESULT = RESULT + RAW_STR;
13      endif
14    endfor
15    add '^' sign at the beginning of RESULT;
16    add '$' sign at the end of RESULT;
17    set OUTPUT as RESULT;
18  <end>
```

CONVERTING FORMAT STRINGS TO REGULAR EXPRESSIONS

BACKGROUND OF THE INVENTION

1. Field of the Invention

The current invention relates to data that is output by computer software applications, and, in particular, to data output to output files.

2. Description of the Related Art

Many software applications generate log files that document events generated or tracked by the corresponding software application. Typically, each entry in a log file corresponds to an event tracked or generated by a corresponding logging module of the corresponding logging application. Typically, logged events in the log file are separated by carriage-return and/or new-line characters so that each logged event is logged on a separate line of the log file. Other separator characters may be used instead.

A software application may contain multiple logging modules, where each logging module is adapted to add entries to a log file corresponding to the software application. It should be noted that the term "module" as used herein, unless otherwise indicated, can refer to a section of source code or to a corresponding entity in the compiled executable application. Typically, the log entries generated by a particular logging module follow a format specified in the source code for the logging module. Log entries by different logging modules in a software application may follow different formats since different logging modules can output different types of information.

The source code for a logging module in the C programming language, as well as related languages, typically includes a formatted-string output function such as fprintf. The formatted-string output function operates on a format string and corresponding parameters. The format string, also known as a format-control string, is a string that specifies the format of resultant log entries. The format string can include (1) fixed characters in the form of character-only strings and (2) type specifiers, which provide information for rendering the corresponding parameters in resultant log entries.

For example, the following line of source code may be found in a module for adding funds to an account: fprintf (LOG_FILE, "%d dollars added to account %s. The new account balance is %d dollars.", nAdded, sAccount, nAccountBalance). Note that (i) LOG_FILE refers to the corresponding log file where the output will be written, (ii) the quoted string "%d . . . dollars" is the format string, and (iii) nAdded, sAccount, and nAccountBalance are the corresponding parameters. Assuming a sample value of $100 added to sample account 398421A for a new balance of $500, the resultant corresponding entry in the log file would be "100 dollars added to account 398421A. The new account balance is 500 dollars." Assuming a sample value of $34 added to sample account 501388Z for a new balance of $379, the resultant corresponding entry in the log file would be "34 dollars added to account 501388Z. The new account balance is 379 dollars."

A different module of the above sample application might contain the following line of source code: fprintf(LOG_FILE, "%d dollars withdrawn from account %s. The new account balance is %d dollars.", nwithdrawn, sAccount, nAccountBalance). A sample corresponding log entry can be "60 dollars withdrawn from account 398421A. The new account balance is 440 dollars."

It may be useful in analyzing a log file to be able to correlate a particular log entry to the source code module that generated the particular log entry. Presently, this can be done by modifying each formatted-string output function to include a line-number or similar identifier in its output so that each log entry indicates the source-code line number or module that generated that log entry.

However, there are problems with this prior-art approach. Modifying source code, especially where the source code is for a long and/or complex program, is a task often fraught with difficulties, such as maintaining consistency, avoiding creating new software bugs, and unexpected executable behavior due to the changes and/or requisite re-compilation. In addition, the source-code owner might not want the log file to provide information on the structure of the source code since the source code may be a trade secret of the source-code owner while log files generated by an executable application corresponding to the source code may be more widely accessible and could be used to reverse engineer the source code of the executable application. Furthermore, some applications generate log files for transmission over limited-bandwidth telecommunication devices where transmitting the additional log-file information required by the prior-art method would increase the transmission costs associated with transmitting the log file.

SUMMARY OF THE INVENTION

One embodiment of the invention can be a computer-implemented method including accessing a source code, wherein the source code includes one or more formatted-string output functions. Each of the one or more formatted-string output functions: (a) is adapted to instruct a computer executing the source code to output a string entry to an output file, (b) has an associated marker, and (c) comprises a format string. The method further includes processing the one or more formatted-string output functions. In this present embodiment, for each processed formatted-string output function, the processing includes: (a) generating a corresponding regular expression for the format string of said each processed formatted-string output function, and (b) associating the corresponding regular expression with the associated marker of said each processed formatted-string output function.

Another embodiment of the invention can be a computer system containing a processor and a memory. The processor is adapted to access a source code, wherein the source code includes one or more formatted-string output functions. In this present embodiment, each of the one or more formatted-string output functions: (a) is adapted to instruct a computer executing the source code to output a string entry to an output file, (b) has an associated marker, and (c) includes a format string. The processor is further adapted to process the one or more formatted-string output functions, wherein, for each processed formatted-string output function, the processing includes (a) generating a corresponding regular expression for the format string of said each processed formatted-string output function, and (b) associating the corresponding regular expression with the associated marker of said each processed formatted-string output function.

Yet another embodiment of the invention can be a machine-readable medium, having encoded thereon program code, wherein, when the program code is executed by a machine, the machine implements a method including accessing a source code, wherein the source code includes one or more formatted-string output functions. In this present embodiment, each of the one or more formatted-string output functions: (a) is adapted to instruct a computer executing the source code to output a string entry to an output file, (b) has an associated marker, and (c) includes a format string. The method further includes processing the one or more formatted-string output functions. For each processed formatted-string output function, the processing includes: (a) generating a corresponding regular expression for the format string of said each processed formatted-string output function, and (b) associating the corresponding regular expression with the associated marker of said each processed formatted-string output function.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 1 shows a representation of information collections processed in accordance with one embodiment of the present invention.

FIG. 2 shows a flowchart for an exemplary processing of the information collections in FIG. 1.

FIG. 3 shows a system in accordance with an embodiment of the present invention.

FIG. 4 shows pseudo-code for a C# implementation of a segment of FIG. 2.

DETAILED DESCRIPTION

One embodiment of the present invention includes a method for correlating log entries in a log file to the source code modules that generated those log entries. A first part of the method includes processing the source code and generating a list of format strings in the source code and calculating corresponding regular expressions for those format strings. A second part of the method includes processing the log file and the regular expressions to correlate log entries in the log file to the format strings using the regular expressions. As used herein, the term "regular expression" refers to a string that can be used to describe, or match, a set of strings, in accordance with certain syntax rules.

Regular expressions are similar to the expressions used in wildcarding, also known as globbing. Globbing is used, for example, in searching for files in a computer directory. For example, if one were searching for Microsoft Word documents (e.g., files with the extension ".doc") whose title includes the word "printer," then one could use the expression "*printer*.doc" in the search box, where the asterisks are wild card characters which can represent zero or more characters. Resultant matching file names can include "printer sales.doc," "stories about printers.doc," and "printer.doc." However files names such as "monitor sales.doc" and "printer.xls" would not match the "*printer*.doc" expression.

Regular expressions are more versatile, and also more complex, than globbing expressions. A description of one common version of regular expressions type can be found in Vernon Hui's May 10, 1999 article "Microsoft Beefs Up VBScript with Regular Expressions," available at http://msdn2.microsoft.com/en-us/library/ms974570(printer).aspx, incorporated herein by reference in its entirety. Multiple variations, also called flavors, of regular expressions exist. Even the Portable Operating System Interface for uniX (POSIX) standards collection includes at least two distinct flavors (or types) of regular expressions, namely Basic Regular Expressions (BRE) and Enhanced Regular Expressions (ERE).

This embodiment of the present invention is described using the NET flavor of regular expressions, which is used in .NET programming languages such as C# (C sharp). As would be appreciated by one of ordinary skill in the art, the particular flavor used is not crucial to the invention as any one of a plurality of flavors, including not-yet-developed flavors, would work with embodiments of the invention. An example of a .NET-flavor regular expression is "^[−]{0,1}[\\d]{1,5}$"—which can be used to match string representations of integers up to 5 digits long. The "^[−]{0,1}" section indicates that any matching string starts with zero or one minus signs (−), i.e., the minus sign can be considered optional for matching strings. The "[\\d]{1,5}$" section indicates that the zero or one minus signs are immediately followed by one to five consecutive digits and then the end of the matching string. For example, "1618," and "−539" would match the regular expression, but "5.67" and "984h" would not. It should be noted that "^" in a regular expression denotes the start of a string, while "$" in a regular expression denotes the end of the string. Thus, for example, the regular expression "^start" would match the string "start here," but not "This is the start here." Similarly, the regular expression "end$" would match the string "This is the end", but not "The end is near." If neither symbol is included at, respectively, the start or end of a regular expression, then matching substrings may be located anywhere within a string.

The step of processing the source code includes accessing the source code and finding and marking relevant instances of format strings in the source code. This can be accomplished by reading through the source code and adding to a table (i) the format string of every instance of formatted-string output functions that output to a specified type of log file and (ii) the corresponding line number of the formatted-string output function in the source code. It should be noted that the source code can include one or more instances of formatted-string output functions that are not relevant because, e.g., they do not output to the specified type of log file.

In this embodiment, each format string is processed to calculate a corresponding regular expression. A format string is broken up into one or more substrings where each substring includes either a character-only string or a type specifier. For example, the sample format string from above—"%d dollars added to account %s. The new account balance is %d dollars."—would be broken up into the following substrings:

"%d"
"dollars added to account"
"%s"
".The new account balance is"
"%d"
"dollars."

Each substring is then converted into a regular expression. The conversion of character-only strings is straightforward since the corresponding regular expression is the character-only string, with adjustments for certain punctuation marks or other special characters (e.g., using "\\." for a period).

The conversion of type specifiers is more complicated and depends on the specific characteristics of the version of the source code, associated libraries, and of the compiler used to compile the source code and the source code's associated libraries to generate the executable file that will generate the log entries. If, for example, "%d" specifies an integer of up to five digits, then "^[\\d]{1,5}$" would be a corresponding regular expression. If, for example, "%s" represents a string of unlimited length, then "^.*$" (an open wildcard expression) would be a corresponding regular expression.

After regular expressions are calculated for all the substrings of a format string, those regular expressions are concatenated to form a single regular expression corresponding to the format string. For the above example, "[\\d]{1,5} dollars added to account .* \\. The new account balance is [\\d]{1,5}dollars\\.$" would be a corresponding regular expression. Since the format string is no longer necessary, the regular expression can replace the format string in the table of format strings and corresponding line numbers. The resultant table can be saved and used to process multiple log files generated by executable programs corresponding to the processed and compiled source code.

In this embodiment, a log file is processed by attempting to match each regular expression from the table to each log entry. Each log entry is then associated with the line number(s) of the one or more matching regular expressions. Each log entry in the log file is modified to include the associated line number(s) so that a review of the processed log file will show the generated associations in a manner that is easy to perceive. Assuming that the executable program compiled from the processed source code file is the only program that writes to the log file, then every log entry in the log file will have at least one associated line number. Assuming further that each formatted-string-output-function module that generates log entries for the log file generates unique-format log entries, then each log entry in the log file will have exactly one associated line number, which indicates the line number of the formatted-string output function of the module that generated that log entry. This information may be useful in debugging and tracing program function.

FIG. 1 shows a representation of information collections processed in one embodiment of the present invention. Target source code 101 is processed to generate format-string list 102, which includes the selected format strings from source code 101 and associated markings, where the markings indicate the line number in the target source code of the format string. List 102 is processed to generate corresponding-regular-expressions list 103, which includes regular expressions corresponding to the format strings and associated markings from list 102. List 103 and log file 104 are then processed to generate log-list 105, which includes the log entries of log file 104 and associated markings indicating the line number(s) of the associated source format string(s).

It should be noted that list 103 can be used multiple times with different log files (not shown) that are different from log file 104. There may be multiple copies of executable programs (not shown) compiled from target source code 101. Each program may generate multiple log files. Typically, each of those log files can be processed using list 103 to generate a corresponding log-list (not shown) similar to log-list 105 to indicate associated format-string origination. There is no need to re-process target source code 101 and/or list 102 every time it is desired to process a log file to indicate associated format-string originations for the log entries of the log file.

FIG. 2 shows flowchart 200 for an exemplary processing of the information collections in FIG. 1. The process commences with start step 201. Target source code 101 is processed to generate list 102 of format strings and origination markers (step 202). The first format string of list 102 is accessed (step 203). The format string is broken up into one or more substrings, as appropriate (step 204). A regular expression is generated for each substring (step 205). The regular expressions of the substrings are concatenated to form one regular expression corresponding to the format string (step 206), which is added to list 103 together with the associated origination-marking for the format string.

If there are additional format strings in list 102 (step 207), then the next format string is accessed (step 208), and the process loops back to step 204. If there are no more format strings in list 102 (step 207), then target log file 104 and list 103 are processed to associate each log entry in log file 104 with zero or more matching regular expressions in list 103 and their associated origination-markings for the corresponding format strings (step 209). The process then terminates (step 210). It should be noted that after steps 201 through 207 have been performed, step 209 can be performed independently and multiple times. Thus, once list 103 is created, it can be used to process multiple target log files and not just log file 104. It should also be noted that step 209 can be skipped, where the process ends with saving list 103 for possible future use.

FIG. 3 shows system 300 in accordance with an embodiment of the present invention. System 300 includes processor 301 and memory 302, connected by path 301a. Processor 301 performs the steps enumerated in flowchart 200 of FIG. 2. Memory 302 stores the information collections of FIG. 1, i.e., source code 101, lists 102, 103, and 105, and log file 104. It should be noted that memory 302 can include multiple types of memory (e.g., volatile and nonvolatile) resident in different locations, where the different types of memory are used to store different information collections of FIG. 1.

FIG. 4 shows pseudo-code for a C# implementation of a segment of step 205 of FIG. 2. The steps are implemented using two object classes: RegExpConverter and PrintFType. A RegExpConverter object includes the following methods: (1) public GetRegExp (lines 1-18), which takes a format string as an input and returns a generated corresponding regular expression, and (2) private tokenizeStrings, which takes a format string as an input and returns a string array containing the constituent substrings of the format string.

A PrintFType object includes the following methods: (1) public object constructor—PrintFType, which constructs a PrintFType object and parses the format string given as input, and (2) public GenerateRegularExpression, which generates a corresponding regular expression for a string given as an input to the constructor.

When the GetRegExp method is called with a format string (STRING) input (line 1 of FIG. 4), then the input format string is read (lines 2-3) and a result string (RESULT) is initialized to an empty string (line 4). The tokenizeStrings method is called to get an array of substrings (RAW_STRINGS) corresponding to the input format string (lines 5-6). For each substring in the array, GetRegExp determines whether the substring is a type specifier (lines 7-8). If a substring is a type specifier, then a PrintFType object is created and the GenerateRegularExpression method of the PrintFType object is called (lines 9-10). The result of the GenerateRegularExpression method is appended to the result string (lines 9-10). If a substring is not a type specifier, i.e., if the substring is a raw string, then the substring is appended to the result string (lines 11-12). String-starting and -ending characters are added to the result string (lines 15-16), and the result string is then output by the GetRegExp method (lines 17-18).

It should be noted that, in an alternative implementation, the result of each invocation of the GenerateRegularExpression method is stored in the corresponding location in the substring array, where, after all the substrings of the array are processed, the substring array includes raw strings and regular expressions corresponding to type specifiers. The elements of the substring array are then concatenated to form the result string for output (rather than performing incremental concatenations through iterative appending).

Table 1 below shows several examples of format strings, corresponding regular expressions, sample strings that match each regular expression, and sample strings that do not match each regular expression.

TABLE 1

| Format String | Corresponding Regular Expression | Sample Matching String(s) | Sample Non-matching String(s) |
|---|---|---|---|
| "%i" | "^[-]{0,1}[\\d]{1,5}$" | "1" <br> "-1" <br> "11" <br> "-11" <br> "11111" <br> "-11111" | "-" <br> "11H" <br> "123456" |
| "%f %f %f" | "^[-]{0,1}[\\d]{1,37}(\\.[\\d]{6,6}){0,1} [-]{0,1}[\\d]{1,37}(\\.[\\d]{6,6}){0,1} [-]{0,1}[\\d]{1,37}(\\.[\\d]{6,6}){0,1}$" | "-0.111111 0.222222 11111.111111" | "0 -0.1 .1" |
| "%s" | "^.*$" | "any string will match" | |
| "Before %d after" | "^Before [-]{0,1}[\\d]{1,5} after$" | "Before -345 after" <br> "Before 12345 after" | "Before 2.22 after" <br> "Before two after" <br> "Before 1234" <br> "12345 after" |

It should be noted that raw strings, as used herein, and unless otherwise indicated, refer to strings that are treated as containing no escape characters (e.g., '\n' which represents a new line in certain contexts). Raw strings can be designated as such because (1) they actually do not contain any escape characters or (2) they are designated as raw strings so that any escape characters contained therein are treated as literal characters (i.e., "\n" would be treated as a two-character string containing '\' and 'n').

In one embodiment of the invention, if a variable corresponding to a type specifier is an enumerated type, where the variable can take only a limited range of values, then the regular expression corresponding to that type specifiers can consist of the possible values of the variable, rather than of the default regular expression for that kind of type specifier.

An embodiment of the invention has been described wherein the step of processing the source code file produces a table whose rows include a format string and a line number. In one alternative embodiment, the calculation of a corresponding regular expression is performed on each format string before finding the next formatted-string output function in the source code. The resultant regular expression is then inserted in the appropriate row of the table, either as an additional field or in place of the corresponding format string. In another alternative embodiment, all the relevant format strings are added to the table and then as each corresponding regular expression is calculated, the regular expression replaces the corresponding format string in the table. In general, embodiments of the invention may use, in the processing of information, any suitable arrays, tables, or other collections of information that may be stored in volatile, non-volatile, or any other suitable memory.

Embodiments of the invention have been described which use tables and/or lists to track the format strings, corresponding markers, and/or corresponding regular expressions. In alternative embodiments, other means for tracking and relating data collections are used instead of or in conjunction with the tables and lists described. For example, arrays or text files may be used for tracking and relating data collections. Furthermore, data items may be related by (1) being placed in the same record in a database, (2) being placed on the same line of a list or text file, (3) being related by intermediary connectors, and/or (4) any other means for relating data items now known or later developed in the art.

An embodiment of the invention has been described where a format string is marked using the line number in the source code of the corresponding formatted-string output function. In some alternative embodiments, additional information may be included in the marking, such as a file name for the source code file. In some alternative embodiments, marking of format strings is done using a descriptive name for the module containing the corresponding formatted-string output function, rather than the line number in the source code of the formatted-string output function. The descriptive name can be specified in the source code or can have its value determined at a later time. The descriptive name may be a code designed to be deciphered only by appropriate entities.

An embodiment of the invention has been described where a format string is broken up into substrings containing raw strings and type specifiers. In alternative embodiments, other procedures for generating substrings may be used. For example, substrings may be based on particular separator characters and/or substring lengths.

In some embodiments, a formatted-string output function may contain one or more parameters that may be used to modify or limit the regular expressions generated for the corresponding format string. For example, safe printf functions, such as sprintf, include a parameter that limits the total length of the output. If the maximum length parameter limits the corresponding log entry to a specified number of characters, then the regular expressions for string-type specifiers in the format string (e.g., "%s") can be limited to that specified number or an appropriate smaller number. For example, if a log entry is limited to 200 characters, then the regular expression for a string-type specifier in the corresponding format string can be ".{200}" (rather than ".*"), or a smaller number based on the minimum number of characters needed by the rest of the format string.

In some embodiments, the definitions of one or more of the parameters of the format-string output functions may be available to the processor processing the source code. If the parameters are defined in limited ways, then the corresponding regular expressions for the corresponding type specifier can be correspondingly limited. For example, if sAccount, the corresponding variable to a string-type specifier in a format string, is known to be limited to a 7-character string, then ".{7}" (rather than ".*") can be a corresponding regular expression. If sAccount is further known to be limited to 7alphanumeric characters, then "^[a-z,A-Z,0-9]{7}$" can be a corresponding regular expression.

Embodiments of the invention have been described where the source code is compiled to generate an executable program. In alternative embodiments, different means for executing, i.e., implementing the instructions of, the source code are used. For example, in one such alternative implementation, an interpreter is used to execute the source code.

In general, source code may be adapted to output string entries to output files. Embodiments of the invention have been described where the string entries are log entries and the output files are log files. In alternative embodiments, source code may be adapted to output string entries other than log entries to output files other than log files.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

The term "nonvolatile memory," as used herein, refers to any type of memory that substantially retains its stored contents after disconnection from its power supply, i.e., the stored contents can be retrieved after reconnecting the nonvolatile memory to a power supply. Examples of nonvolatile memory include, but are not necessarily limited to (i) fuse/antifuse devices such as OTP memory and PROM, (ii) charge-storing devices such as EPROM and EEPROM and flash ROM, (iii) magnetic media devices such as hard drives and tapes, and (iv) optical, opto-electrical, and opto-magnetic media such as CDs and DVDs.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

We claim:

1. A computer-implemented method comprising:
(a) accessing a source code, wherein the source code comprises one or more formatted-string output functions, wherein one or more of the formatted-string output functions:
is adapted to instruct a computer executing the source code to output a string entry to an output file;
has an associated marker; and
comprises a format string, wherein the format string includes one or more type specifiers;
(b) processing the one or more formatted-string output functions using a data structure, wherein, for each processed formatted-string output function, the processing comprises:
generating a corresponding regular expression for the format string of said each processed formatted-string output function; and
using the data structure to associate the corresponding regular expression with the associated marker of said each processed formatted-string output function; and
(c) processing the output file using the data structure to associate a string entry in the output file with an associated marker of a formatted-string output function that outputted the string entry, the processing comprises, for a string entry of the output file:
matching the string entry to one of the regular expressions of the data structure; and
associating the string entry with the marker associated with the matching regular expression of the data structure.

2. The method of claim 1, wherein:
the data structure is stored in a computer-readable memory; and
the data structure comprises the corresponding regular expressions and associated markers.

3. The method of claim 2, wherein:
the stored data structure is adapted to be used for processing the output file; and
each marker in the data structure uniquely identifies the associated formatted-string output function within the source code.

4. The method of claim 2, wherein:
the output file comprises one or more log entries;
each log entry comprises a string entry; and
the processing of the output file generates and stores, in the computer-readable memory, a second data structure comprising the log entries of the output file and, for each string entry therein, the marker associated with the string entry.

5. The method of claim 2, wherein the stored data structure is further adapted to be used for processing another output file generated by executing the source code, wherein the processing comprises, for a string entry of the other output file:
matching the string entry to the regular expressions of the data structure; and
associating the string entry with the marker associated with the matching regular expression of the data structure.

6. The method of claim 1, wherein the computer implementing the method is different from the computer that executes the source code.

7. The method of claim 1, wherein the source code comprises at least one formatted-string output function that is adapted to instruct the computer executing the source code to output a first string entry to an output other than the output file.

8. The method of claim 1, wherein the step of associating comprises modifying the string entry to include the marker associated with the matching regular expression.

9. The method of claim 1, wherein the step of associating comprises adding to a result file the string entry and the marker associated with the matching regular expression.

10. The method of claim 1, wherein, for each processed formatted-string output function:
the formatted-string output function has a line in the source code; and
the associated marker comprises the line number.

11. The method of claim 10, wherein the associated marker further comprises an additional identifier.

12. The method of claim 1, wherein the step of generating a corresponding regular expression comprises:
breaking up the format string into one or more substrings, wherein each substring comprises only one of (i) a type specifier and (ii) a raw string;
generating a regular expression for each substring; and
concatenating the regular expressions for the substrings to generate the corresponding regular expression for the format string.

13. The method of claim 12, wherein:
a default regular expression corresponding to a string-type type specifier is an open wildcard expression; and
the step of generating the regular expression for each substring comprises determining whether the substring is the string-type type specifier and, if so, then using information from the corresponding formatted-string output function, other than the format string, to generate the regular expression, which is different from the open wildcard expression.

14. The method of claim 1, wherein no two regular expressions are identical.

15. The method of claim 1, wherein the string entry is a log entry and the output file is a log file.

16. The method of claim 1, wherein executing the source code comprises one of (1) running an executable program generated from the source code by a compiler and (2) running an interpreter program having the source code as an input.

17. A computer system comprising a processor and a memory, wherein the processor is adapted to:
(a) access a source code, wherein the source code comprises one or more formatted-string output functions, wherein one or more of the formatted-string output functions:
is adapted to instruct a computer executing the source code to output a string entry to an output file;
has an associated marker; and
comprises a format string, wherein the format string includes one or more type specifiers;
(b) process the one or more formatted-string output functions using a data structure, wherein, for each processed formatted-string output function, the processing comprises:
generating a corresponding regular expression for the format string of said each processed formatted-string output function; and
using the data structure to associate the corresponding regular expression with the associated marker of said each processed formatted-string output function; and
(c) process the output file using the data structure to associate a string entry in the output file with an associated marker of a formatted-string output function that outputted the string entry, the processing comprises, for a string entry of the output file:
matching the string entry to one of the regular expressions of the data structure; and
associating the string entry with the marker associated with the matching regular expression of the data structure.

18. The system of claim 17, wherein the memory is adapted to store the source code, output file, generated regular expressions, and associated markers.

19. The system of claim 17, wherein the processor is further adapted to save the data structure, which comprises the corresponding regular expressions and associated markers.

20. The system of claim 17, wherein, in generating a corresponding regular expression, the processor is adapted to:
break up the format string into one or more substrings, wherein each substring comprises only one of (i) a type specifier and (ii) a raw string;
generate a regular expression for each substring; and
concatenate the regular expressions for the substrings to generate the corresponding regular expression for the format string.

21. The system of claim 17, wherein the string entry is a log entry and the output file is a log file.

22. A non-transitory machine-readable medium, having encoded thereon program code, wherein, when the program code is executed by a machine, the machine implements a method comprising:
(a) accessing a source code, wherein the source code comprises one or more formatted-string output functions, wherein one or more of the formatted-string output functions:
is adapted to instruct a computer executing the source code to output a string entry to an output file;
has an associated marker; and
comprises a format string, wherein the format string includes one or more type specifiers;
(b) processing the one or more formatted-string output functions using a data structure, wherein, for each processed formatted-string output function, the processing comprises:
generating a corresponding regular expression for the format string of said each processed formatted-string output function; and
using the data structure to associate the corresponding regular expression with the associated marker of said each processed formatted-string output function; and
(c) processing the output file using the data structure to associate a string entry in the output file with an associated marker of a formatted-string output function that outputted the string entry, the processing comprises, for a string entry of the output file:
matching the string entry to one of the regular expressions of the data structure; and
associating the string entry with the marker associated with the matching regular expression of the data structure.

* * * * *